(12) United States Patent
Murasawa

(10) Patent No.: US 8,705,889 B2
(45) Date of Patent: Apr. 22, 2014

(54) IMAGE PROCESSING APPARATUS, IMAGE FORMING SYSTEM, AND IMAGE FORMING METHOD WITH GEOMETRIC PROCESSING

(75) Inventor: Kouta Murasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 13/224,570

(22) Filed: Sep. 2, 2011

(65) Prior Publication Data

US 2012/0063640 A1 Mar. 15, 2012

(30) Foreign Application Priority Data

Sep. 15, 2010 (JP) ................................ 2010-207156

(51) Int. Cl.
*G06K 9/20* (2006.01)
*G06K 9/32* (2006.01)
*G09G 5/00* (2006.01)

(52) U.S. Cl.
USPC ............ 382/282; 382/293; 345/619; 345/620

(58) Field of Classification Search
USPC ......... 382/321, 112, 176, 167, 276, 282, 293, 382/296, 300, 301; 358/1.18, 1.9, 474, 488
See application file for complete search history.

(56) References Cited

U.S. PATENT DOCUMENTS

| | | | | |
|---|---|---|---|---|
| 6,654,506 B1* | 11/2003 | Luo et al. | ...................... | 382/282 |
| 7,068,855 B2* | 6/2006 | Simske et al. | ................ | 382/289 |
| 7,978,918 B2* | 7/2011 | Scalise et al. | ................ | 382/228 |
| 8,391,593 B2* | 3/2013 | Lin et al. | ....................... | 382/164 |
| 2004/0064786 A1 | 4/2004 | Ikeda et al. | | |
| 2005/0117802 A1* | 6/2005 | Yonaha et al. | ................ | 382/173 |
| 2005/0276477 A1* | 12/2005 | Lin et al. | ....................... | 382/173 |
| 2007/0236762 A1* | 10/2007 | Tsuji | ............................ | 358/537 |
| 2008/0019574 A1* | 1/2008 | Scalise et al. | ................ | 382/118 |
| 2008/0193047 A1* | 8/2008 | Mitani | .......................... | 382/282 |
| 2010/0328722 A1* | 12/2010 | Yasunaga | ..................... | 358/1.15 |
| 2011/0289504 A1 | 11/2011 | Murasawa | | |

FOREIGN PATENT DOCUMENTS

JP 2004-164570 A 6/2004

* cited by examiner

*Primary Examiner* — Andrae S Allison
(74) *Attorney, Agent, or Firm* — Fitzpatrick, Cella, Harper & Scinto

(57) ABSTRACT

An upstream image processing apparatus determines, when geometric conversion is instructed, whether the result of downstream correction processing changes due to the geometric conversion, and if it changes, the apparatus changes the conversion to geometric conversion that does not cause a change in the correction result. Then, the geometric conversion is performed on a target image, and the resultant image is transmitted to a downstream image processing apparatus. Together therewith, instruction information indicating an instruction for correction processing and instruction information indicating geometric transformation processing for performing geometric transformation processing to the instructed degree are transmitted to the downstream image processing apparatus. The downstream image processing apparatus adds an instruction for image processing as appropriate, and thereafter transmits the resultant data to an image forming apparatus. The image forming apparatus forms an image by performing correction processing and geometric transformation processing that have been instructed.

10 Claims, 13 Drawing Sheets

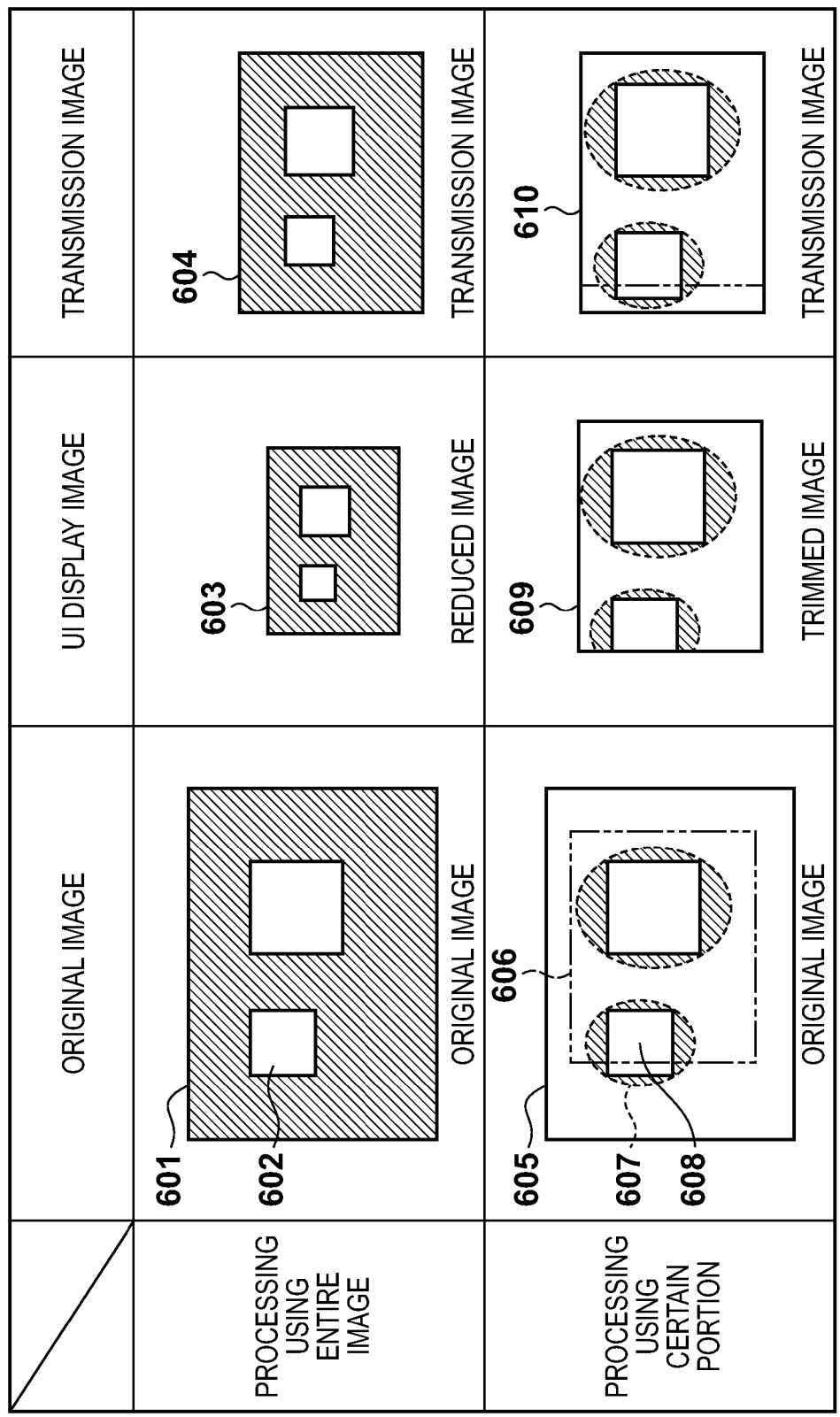

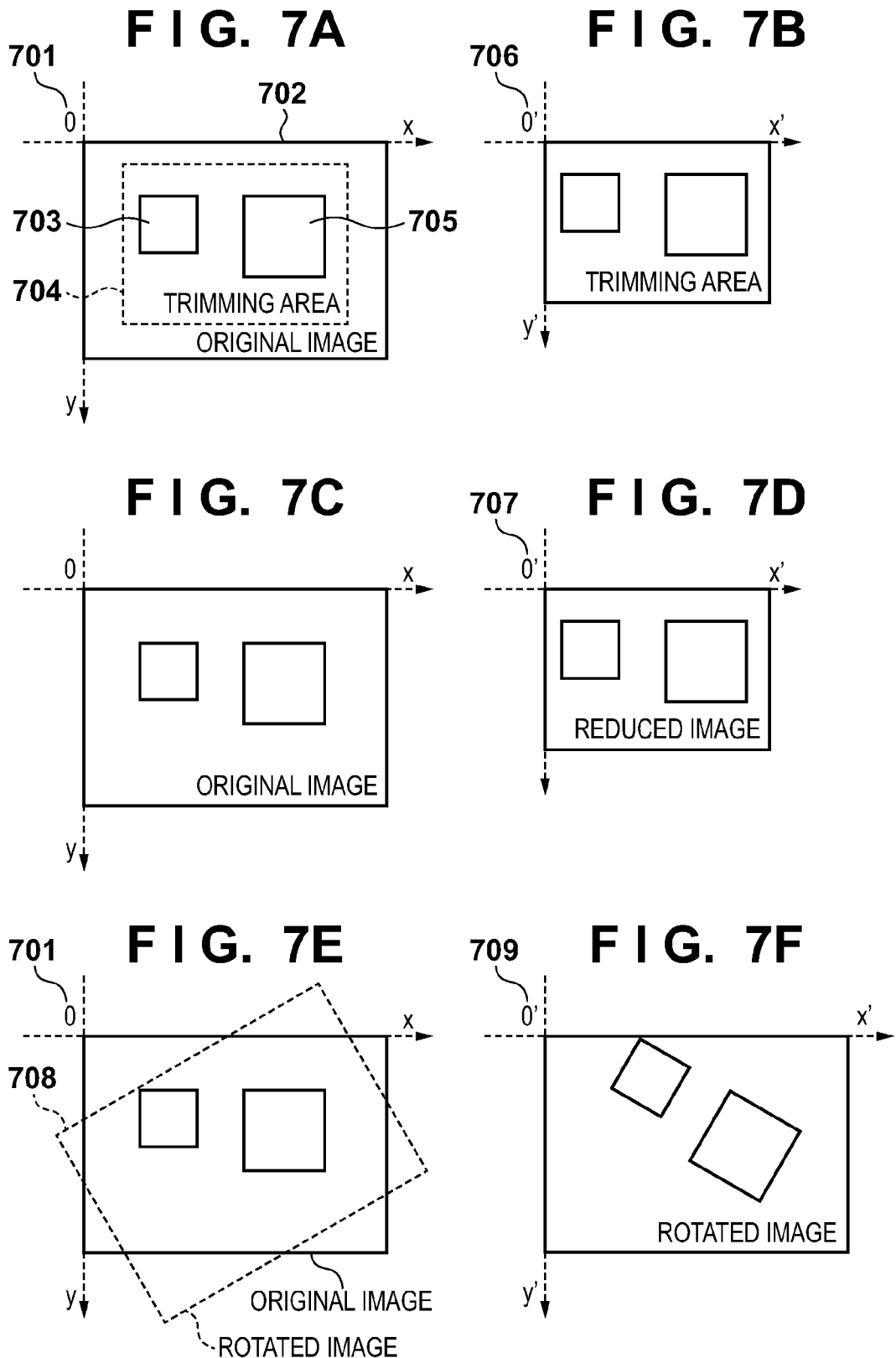

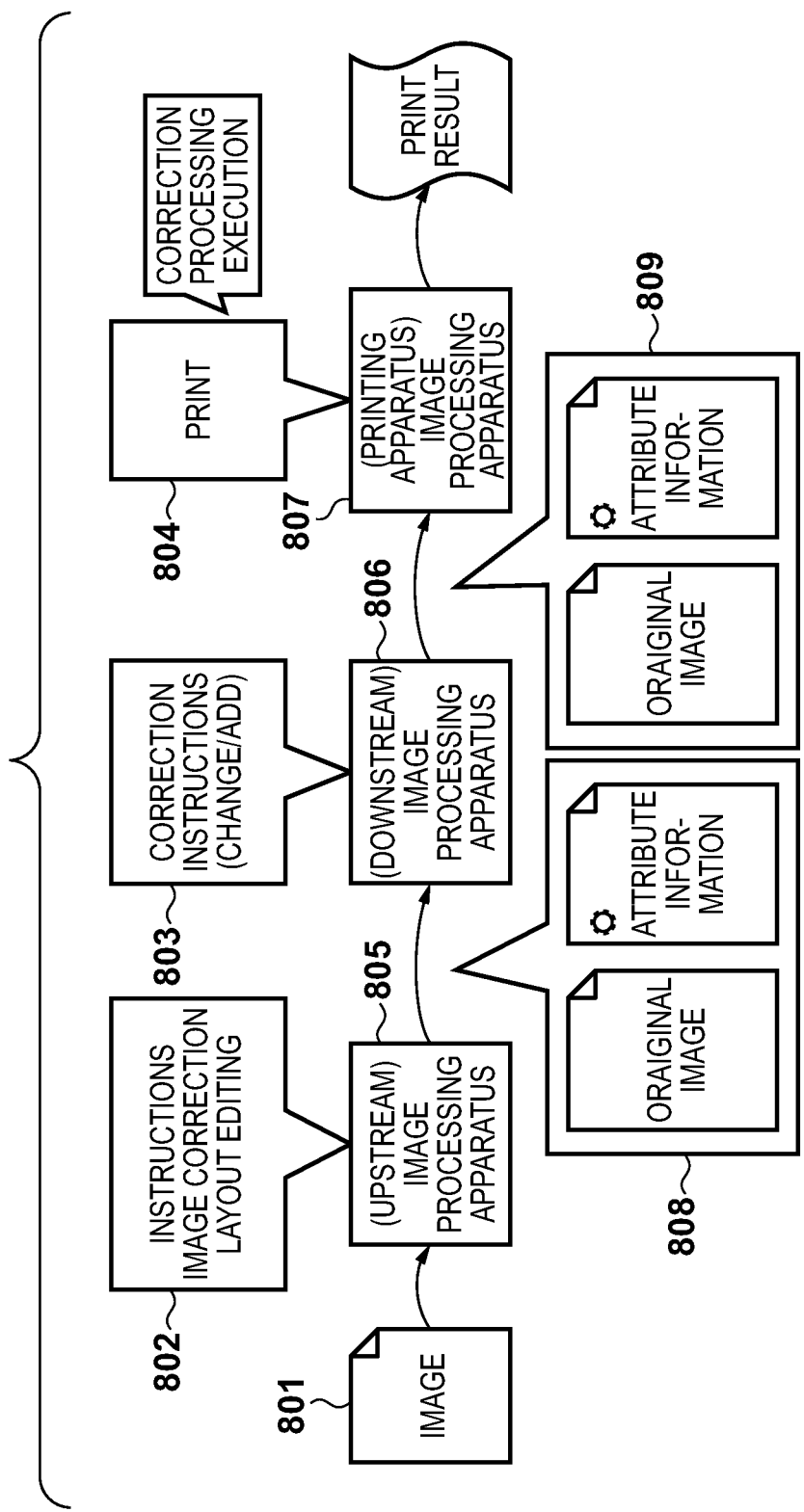

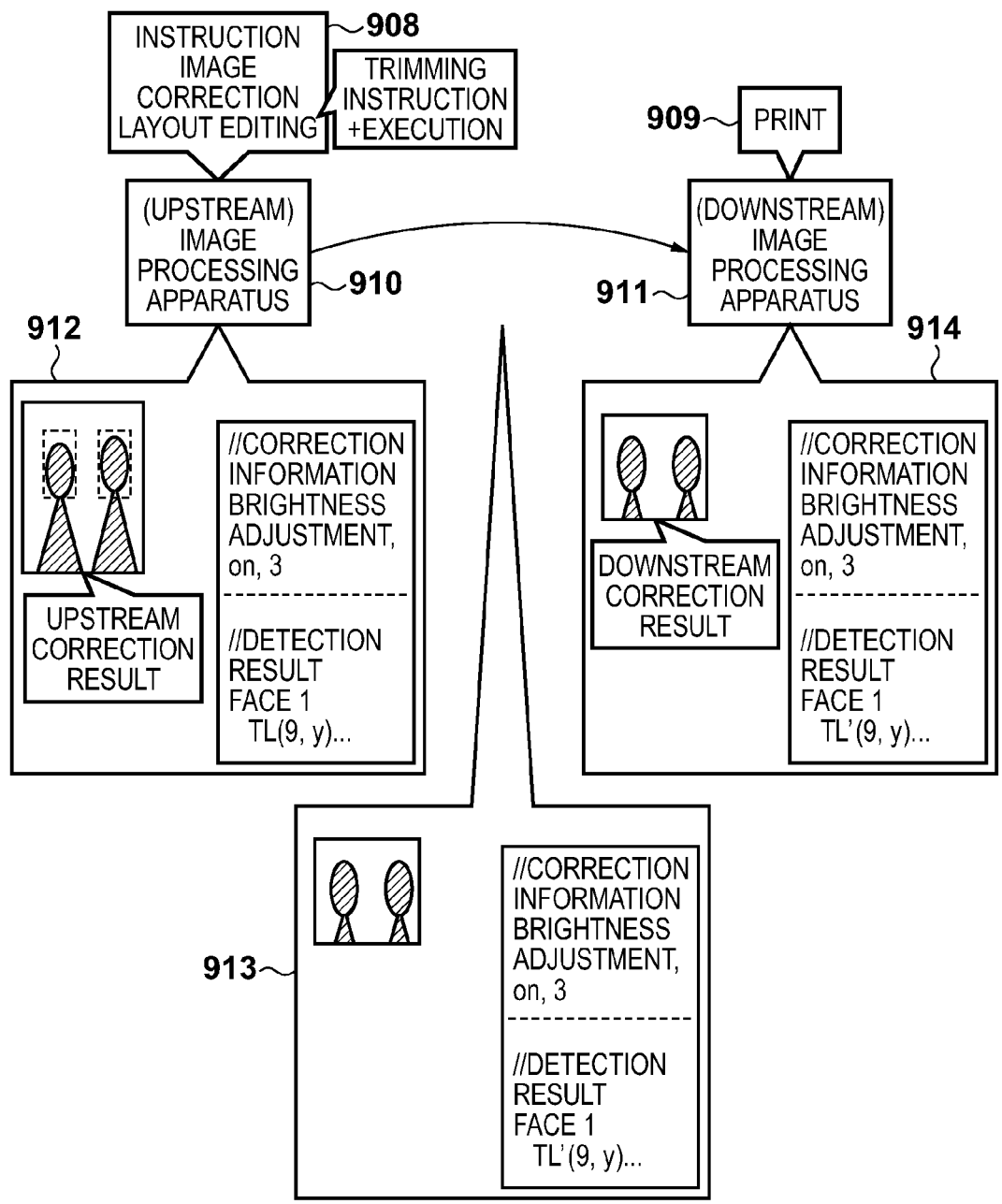
F I G. 9B

IMAGE PROCESSING APPARATUS, IMAGE FORMING SYSTEM, AND IMAGE FORMING METHOD WITH GEOMETRIC PROCESSING

BACKGROUND OF THE INVENTION

1. Field of the Invention

The present invention relates to an image processing apparatus, an image forming system, and an image forming method for controlling an image processing workflow.

2. Description of the Related Art

Recently, the number of applications for image modification and correction, which are classified as photo retouching applications, is increasing. Usage of image data by using such photo retouching applications to correct and adjust captured image data, and (then) print the resultant data or upload the resultant data on the Web so as to be shared or released to the public is growing.

Functions provided by the photo retouching applications include basic correction and adjustment for problems with captured image data, such as, for example, adjustment of the angle of view and adjustment of brightness and color. In addition to such functions, some photo retouching applications analyze image data and automatically correct the data.

Further, recently, services enabling printing of photographs or an album to be ordered at a store or on the Web (which will be referred to as print-on-demand services) have also been increasingly offered. For example, a memory card storing photographs is taken to a store, and inserted in an order terminal at the store. A print format is selected, and images to be printed are selected, thereby making an order. Such orders are collected by a server, and an operator checks the order content and images. Then, printing in accordance with the order content is executed by a printer, thereby completing printing of photographs.

Photo retouching applications are being utilized in the workflow of such print-on-demand services. Ordinarily, the photo retouching applications are utilized for correction of photographs by a user when an order is made and for modification by an operator before printing so as to improve the result of photographs. Further, in album printing, an application having functions such as trimming and rotation of images is also utilized.

Now, the conventional workflow of a print-on-demand service will be described with reference to FIG. 8. The conventional workflow is roughly divided into three stages, namely, upstream processing 805, downstream processing 806, and a printing apparatus 807. The upstream processing 805 is performed at an order terminal such as a store terminal or a local PC. In the upstream processing 805, an image to be printed is selected from among images 801 stored in a memory card or a hard disk, and instructions 802 such as print size, print type and correction processing are input, thereby making an order for printing. In the downstream processing 806, the order from the upstream processing 805 is received, and an operator adjusts the image and gives a print instruction to the printing apparatus 807 based on the order content. At that time, additional correction instructions 803 may be input. The printing apparatus 807 executes print processing 804 in accordance with the print instruction from the downstream processing 806.

In this workflow, original image data and attribute information are transmitted, in the processing in each stage, to processing in the next stage as shown by transmission data 808 from the upstream processing 805 and transmission data 809 from the downstream processing 806. The user instructions 802 and the instructions 803 that have been input in the processing of the transmission source, such as print type and correction instructions are stored in attribute information and transmitted. Then, the printing apparatus 807 performs correction processing on the original image in accordance with the user instructions stored in the attribute information, immediately before the printing. In this way, the consistency of correction processing and the correction image quality can be maintained.

As one technology for carrying out workflow processing, Japanese Patent Laid-Open No. 2004-164570 describes a method using a job ticket. In Japanese Patent Laid-Open No. 2004-164570, a job ticket corresponding to a generated workflow is generated, and necessary processing is performed in accordance with the job ticket issued by a workflow generating apparatus.

The image processing workflow in the above print-on-demand service may be applied not only to photograph printing in sheet form, but also to album printing, and it is expected that album printing will increase with expanding functionality from now on. The following problems may occur in such a situation.

Album printing has a function for photograph layout. For photograph layout, it is necessary to perform geometric conversion such as trimming, enlargement/reduction (scaling), or rotation on an image. In such a case, a problem with the workflow in FIG. 8 is that there is certain correction processing according to which a correction result obtained by performing the correction processing on an image as-is and a correction result obtained by performing geometric conversion on the image and thereafter performing the same correction processing thereon do not match. As an example, the result obtained by performing automatic photograph correction on an original image as-is and the result obtained by performing automatic photograph correction on an image on which trimming has been performed do not match. However, on the other hand, there is also correction processing that does not cause a change in the correction result even if geometric conversion is performed.

In the same manner as in the workflow in FIG. 8, if an instruction for geometric conversion is also transmitted as attribute information, and it is ensured that geometric transformation processing is performed after other correction processing, image quality after correction can be maintained constant. However, if the geometric conversion is conversion for reducing the amount of image data, such as, for example, trimming or reduction, wasteful data will be transmitted, and also other correction processing may be performed needlessly, which wastes time and resources. In particular, in album printing, there is a high possibility that a large amount of image data will be transmitted and that portions of images will be utilized, and thus when considering optimization of the entire workflow, geometric conversion for reducing the amount of data to be transferred should be performed before data transmission and correction processing.

There is also a method of causing correction results to match independent of whether geometric conversion is performed, by transmitting an image detection result and a correction parameter to downstream processing and reusing them. An example of such a case is where face detection is performed, and correction such as, for example, red-eye correction is performed using the detection result thereof. In this case, face detection is performed during upstream processing, and the detection result thereof and an instruction parameter of correction processing according thereto are transmitted to downstream processing, thereby enabling the result of correction processing to be stabilized while reducing the load of downstream processing.

However, even if, for example, face detection is performed in upstream processing, and the result thereof is transmitted to downstream processing, when the face region of the image is cut away by trimming, there will be no image region to which the face detection result corresponds, and thus the face detection result cannot be utilized in downstream processing. Even if a user performs trimming so as to keep a face, the resultant region may be different from the face region that needs face detection, and even in this case, the face region of the image may be cut away by trimming, and thus the face detection result cannot be utilized. In addition thereto, if more correction instructions are given, the amount of data to be transferred may increase since it is necessary to hold all of the correction parameters for the individual correction instructions.

SUMMARY OF THE INVENTION

The present invention has been conceived in view of the above conventional examples, and provides an image processing apparatus and an image processing method that enable suppression of resource waste by reducing the amount of data to be transferred and the load of downstream processing as much as possible while securing image quality after correction in an image processing workflow.

The image processing apparatus of the present invention has the following configurations. Specifically, an image processing apparatus that accepts an instruction for processing with respect to target image data, and transmits image data together with instruction information including an instruction for processing to an image processing apparatus in the next stage, the image processing apparatus comprises: a determination unit, configured to evaluate a difference between first image data obtained by performing instructed geometric transformation processing on the target image data and performing instructed correction processing on the geometrically converted image data and second image data obtained by performing the instructed correction processing on the target image data, and determine whether the difference exceeds a predetermined value; a re-setting unit, configured to set again, if the determination unit determines that the difference exceeds the predetermined value, a parameter of the geometric transformation processing such that the difference between the first image data and the second image data is equal to or less than the predetermined value; and a transmission unit, configured to perform the geometric transformation processing on the target image data using the parameter set by the re-setting unit, and transmit, to the image processing apparatus in the next stage, image data resulting from the processing together with instruction information indicating the instructed correction processing and instruction information indicating the instructed geometric transformation processing.

According to the present invention, the amount of image data to be transferred and the load of downstream processing can be suppressed while securing image quality after correction processing.

Further features of the present invention will become apparent from the following description of exemplary embodiments with reference to the attached drawings.

BRIEF DESCRIPTION OF THE DRAWINGS

FIG. 6 is a diagram showing an example of geometric conversion generation processing according to the first embodiment.

FIGS. 7A to 7F are diagrams illustrating attribute information change according to a second embodiment.

FIG. 8 is a conventional image processing workflow diagram.

FIG. 9B is a diagram illustrating an effect.

DESCRIPTION OF THE EMBODIMENTS

Embodiment 1

Now, a preferred first embodiment of the present invention will be described. This merely shows an embodiment as an example, and the present invention is not limited to the following embodiment.

Description of Hardware Configuration

Figure 1:
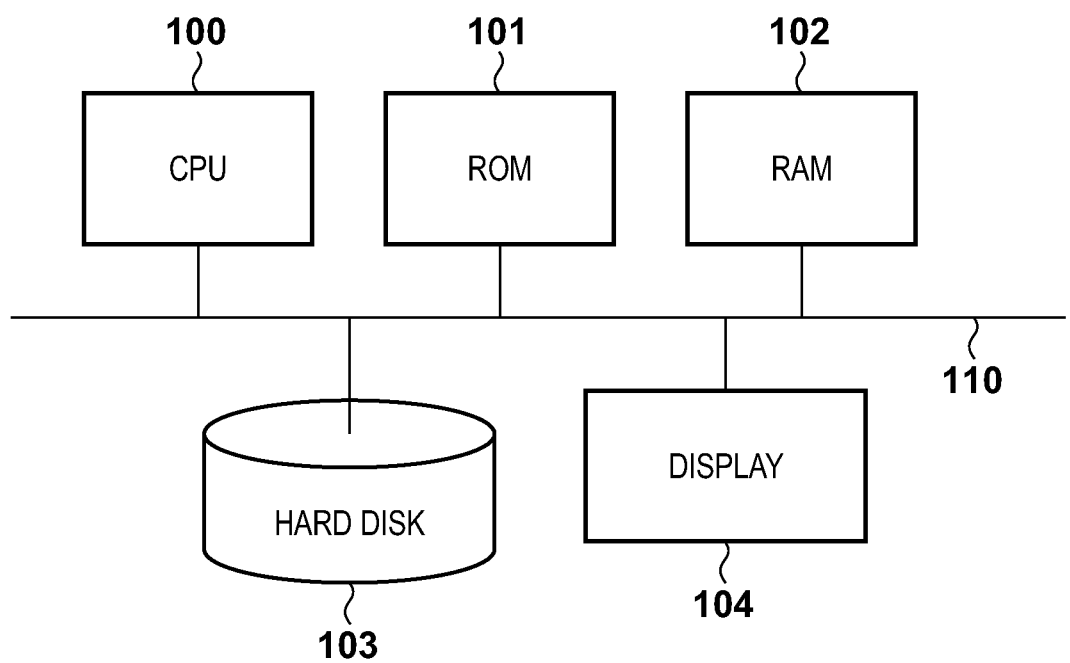
FIG. 1 is a diagram of a hardware configuration that can execute the present invention.

FIG. 1 is a block diagram illustrating an example of a hardware configuration of an information processing apparatus, or in other words, a computer (also referred to as a PC), according to a first embodiment. In FIG. 1, reference numeral 100 denotes a CPU (central processing unit), which executes an information processing method described in the present embodiment in accordance with a program. Reference numeral 101 denotes a ROM, where the program executed by the CPU 100 is stored. Reference numeral 102 denotes a RAM, which provides a memory for temporarily storing various types of information when the CPU 100 executes the program. Reference numeral 103 denotes a hard disk, which is a storage medium for storing image files, parameters for pattern recognition, and the like. Reference numeral 104 denotes a display, which serves as an apparatus that presents the processing result of the present embodiment to a user. Reference numeral 110 denotes a control bus/data bus, which connects the units described above and the CPU 100. In addition, a user interface (UI) for an operator to input instructions for image correction and geometric transformation processing, and the like, an image scanner for reading image data, and a network (communication) interface are provided.

Such an information processing apparatus is provided for each of upstream processing and downstream processing, and in addition, an image forming apparatus is further connected via a network, thereby constituting an image forming system. The information processing apparatus for upstream processing is an image processing apparatus for a person who makes an order for an image print to input image data to be processed and information on instructions for desired image processing and geometric transformation processing, and if an album is created, editing information for the album. Designated image data, input editing instruction information, and the like are transmitted to the information processing apparatus for downstream processing performed by a person who receives the print order, where information on an instruction for image processing, for instance, for increasing the print quality is further input. Note that in the present embodiment, geometric conversion is executed in upstream processing. The information processing apparatus for downstream processing may also be referred to as an image processing apparatus. Then, information obtained by further adding an instruction for correction processing in downstream processing is transmitted to an image forming apparatus (printer) such as an MFP. The image forming apparatus executes correction and editing based on the image data, correction instruction information, and the like that have been received, and prints the result thereof. The hardware configuration of the image forming apparatus is obtained by adding a printing unit such as an electrophotographic printing unit or an inkjet printing unit to the configuration in FIG. 1. Note that a program for realizing image processing and control of the printing unit is necessary as software (or firmware).

The image processing apparatus assumed in the present embodiment is assumed to be an image processing apparatus in which the image processing result does not depend on the order of UI operations. Specifically, for example, the correction result in the case of instructing RGB adjustment after instructing automatic photograph correction and the correction result in the case of instructing automatic photograph correction after instructing RGB adjustment will be the same. Accordingly, restrictions are provided, such as, for example, to always perform automatic correction first and perform other correction on an image resulting from automatic correction, and not to allow execution of automatic correction twice, and these restrictions are realized by starting the execution for the first time after the input of instructions to be executed is completed, instead of executing processing every time an instruction is input. In the case in which there are instructions for a plurality of types of corrections as described above, the order of execution thereof is determined in advance, and correction processing is executed in that order.

Example of Workflow

Figure 2:
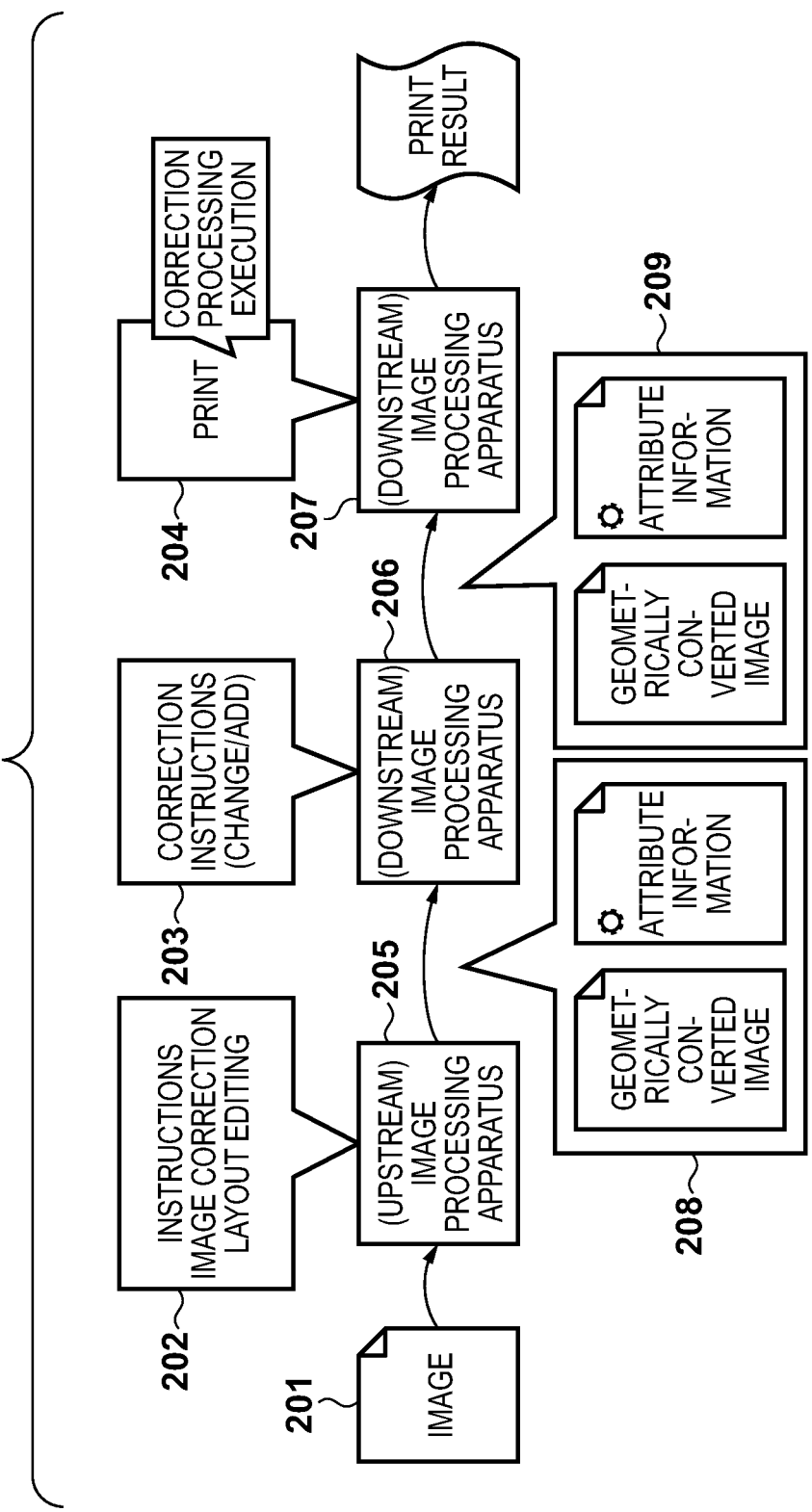
FIG. 2 is a workflow diagram according to a first embodiment.

FIG. 2 shows the workflow of the present embodiment. The workflow will be described with reference to FIG. 2. The workflow in FIG. 2 has a simple configuration to facilitate a description. Reference numeral 205 denotes an upstream processing apparatus, which is assumed to be a store terminal or a user PC. Reference numeral 206 denotes a downstream processing apparatus, which is assumed to be a PC for an operator who receives a print processing order. Reference numeral 207 denotes a downstream processing apparatus, which is assumed to be a printer main body.

First, input image data (target image data) 201 is input to the upstream processing apparatus 205. The input image data 201 may be input from the HDD in the PC, may be input from a storage on the Web, or may be input from a storage apparatus connected to the store terminal.

The upstream processing apparatus 205 accepts user instructions 202. The user instructions 202 are for image correction, layout editing, and the like. The accepted user instructions are stored as user instruction information that enables instructed processing to be uniquely reproduced. Upon the end of the user instructions 202, data is transmitted to the downstream processing apparatus 206. An instruction from a user triggers the end of the user instruction and transmission as well. Data 208 to be transmitted includes an image obtained by performing geometric conversion such as rotation, trimming, or scaling, for example, and attribute information including other editing instruction information and correction instruction information. When data is delivered to the downstream processing apparatus 206, an operator changes the correction instruction 203 and adds correction instructions 203, and the resultant data is transmitted to the printing apparatus 207 as transmission data 209. The printing apparatus 207 executes correction processing 204 in accordance with the correction instructions included in the attribute information on the geometrically converted image that is stored in the transmission data 209, and transmits the correction result to the printing unit.

Geometric conversion here generally means conversion to coordinates at another position on the basis of the coordinates at a current position. For example, geometric conversion means enlargement/reduction, rotation, mirror inversion, and the like. However, here, geometric conversion is assumed to also include trimming for cutting out an arbitrary portion of an image.

Figure 4:
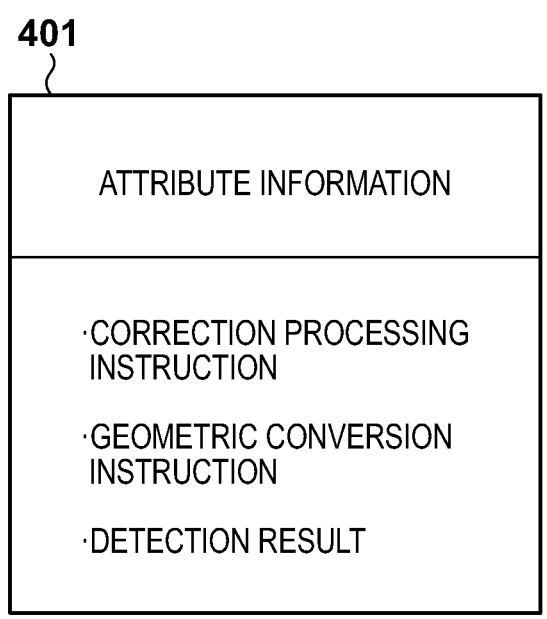
FIG. 4 is a diagram showing an example of attribute information.

Attribute information stores information indicating a correction processing instruction and a geometric conversion instruction from the user, a detection result, and the like, as in attribute information 401 in FIG. 4. The attribute information 401 is an example, and may store other information such as layout information, and information unique to an image, for example.

Although one each of the upstream processing apparatus 205, the downstream processing apparatus 206, and the printing apparatus 207 are provided in this workflow, this is an example, and a plurality of upstream processing apparatuses and downstream processing apparatuses may be provided.

Image Processing Procedure

Figure 3:
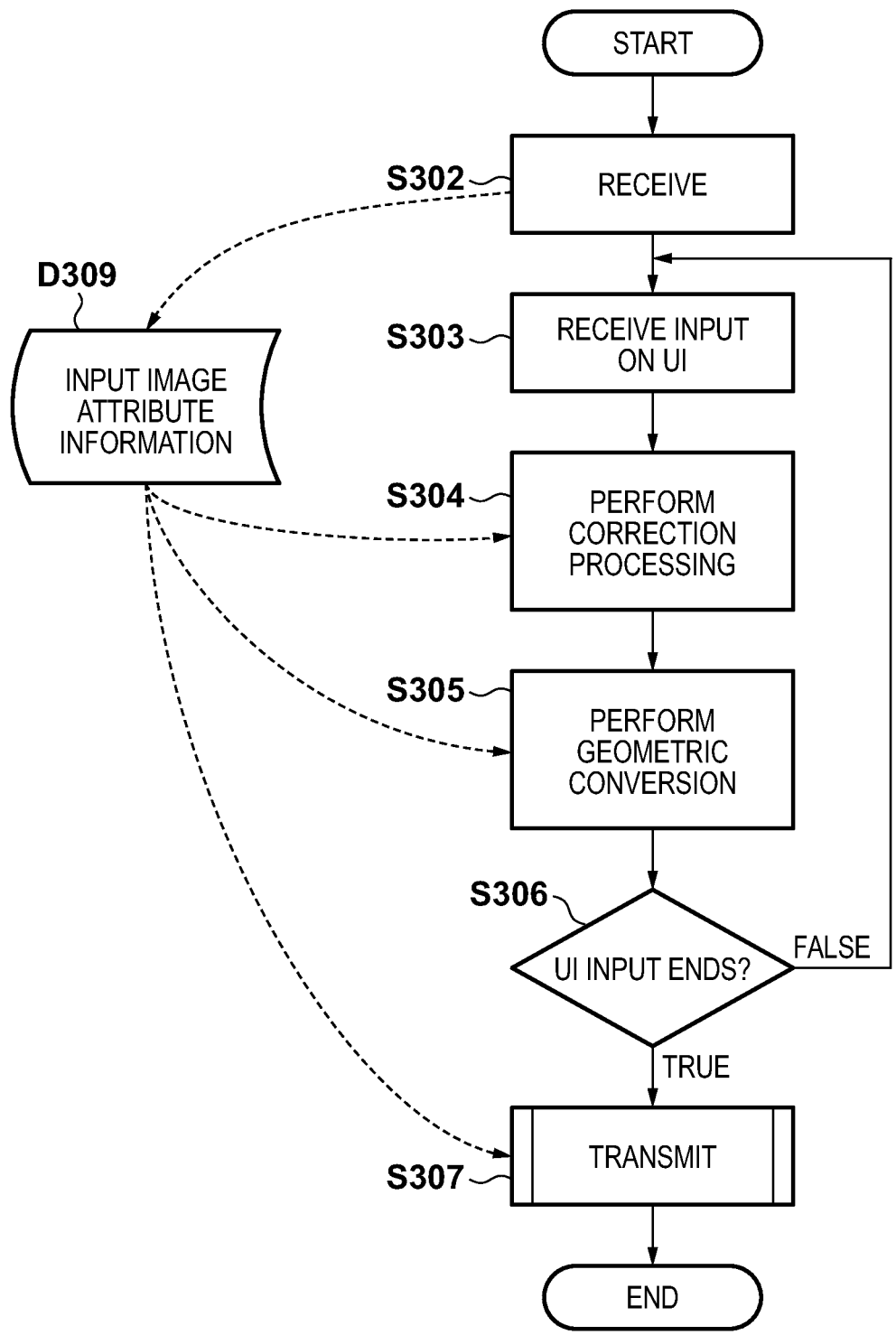
FIG. 3 is a flowchart of the entire processing according to the first embodiment.

Next is a description of a processing flow of the image processing apparatuses with reference to FIG. 3. This processing is common to the upstream processing and the downstream processing.

First, data is received in reception step S302. In the case of upstream processing, received data is image data, and may be obtained by being read by an input device or from a memory device, rather than being received. Here, data obtained in such cases is also inclusively called "received data". The received image data is stored in a storage unit D309. If there is an input of a correction instruction, a detection instruction, a geometric conversion instruction, or the like from the user, the input of a type of, for instance, correction, a parameter therefor, and the like is accepted from the UI or the like in input step S303, and stored in D309 as user instruction information. The types of correction, detection, and conversion include, other than, for example, automatic photograph correction defined in advance, individual correction such as red-eye correction, contrast correction, color temperature correction, anti-aliasing correction, and edge enhancement correction, geometric conversion such as trimming, rotation, and scaling, face region detection, and the like. A parameter is designated for each correction and conversion, and, for example, a parameter indicates an area for trimming in the case of trimming, a center and a rotation angle in the case of rotation, and a scaling factor in the case of scaling, for instance. A parameter that indicates the degree of correction is also designated for other corrections.

Using the stored user instruction information, correction processing S304 and geometric conversion S305 for preview are performed. In steps S304 and S305, image data obtained by performing correction or geometric conversion is previewed, but is not stored in the storage unit D309. After that, it is determined in S306 whether UI input has ended. The end of an input is determined according to a user input. For example, if the user performs correction and changes a parameter thereof while looking at a preview, and makes an input for finalization, it is determined in S306 that the UI input has ended with that input. Further, if correction and geometric conversion are executed in the same order as the execution order in downstream processing, a preview faithful to an actual output can be displayed.

If the input from the user ends, and an instruction for transmission is input, data in D309 is transmitted in transmission step S307, and the processing ends. On the other hand, if the input from the user has not ended, the processing moves to UI input S303, and processing is repeated.

Note that in order to remove dependency of the result of correction or conversion on the processing order, correction and geometric transformation processing for a preview may be collectively executed in the predetermined order after the completion of the input of a correction instruction and the like.

Steps S304 and S305 are steps for preview display on the UI. This flow is an example, and if preview display is not performed, it is not necessary to execute correction processing S304 and geometric transformation processing S305. In this case, it is sufficient that these instructions are stored in the storage unit D309 as instruction information, and transmitted to the next stage. Note that these steps are executed only if preview is performed without executing printing.

Figure 5:
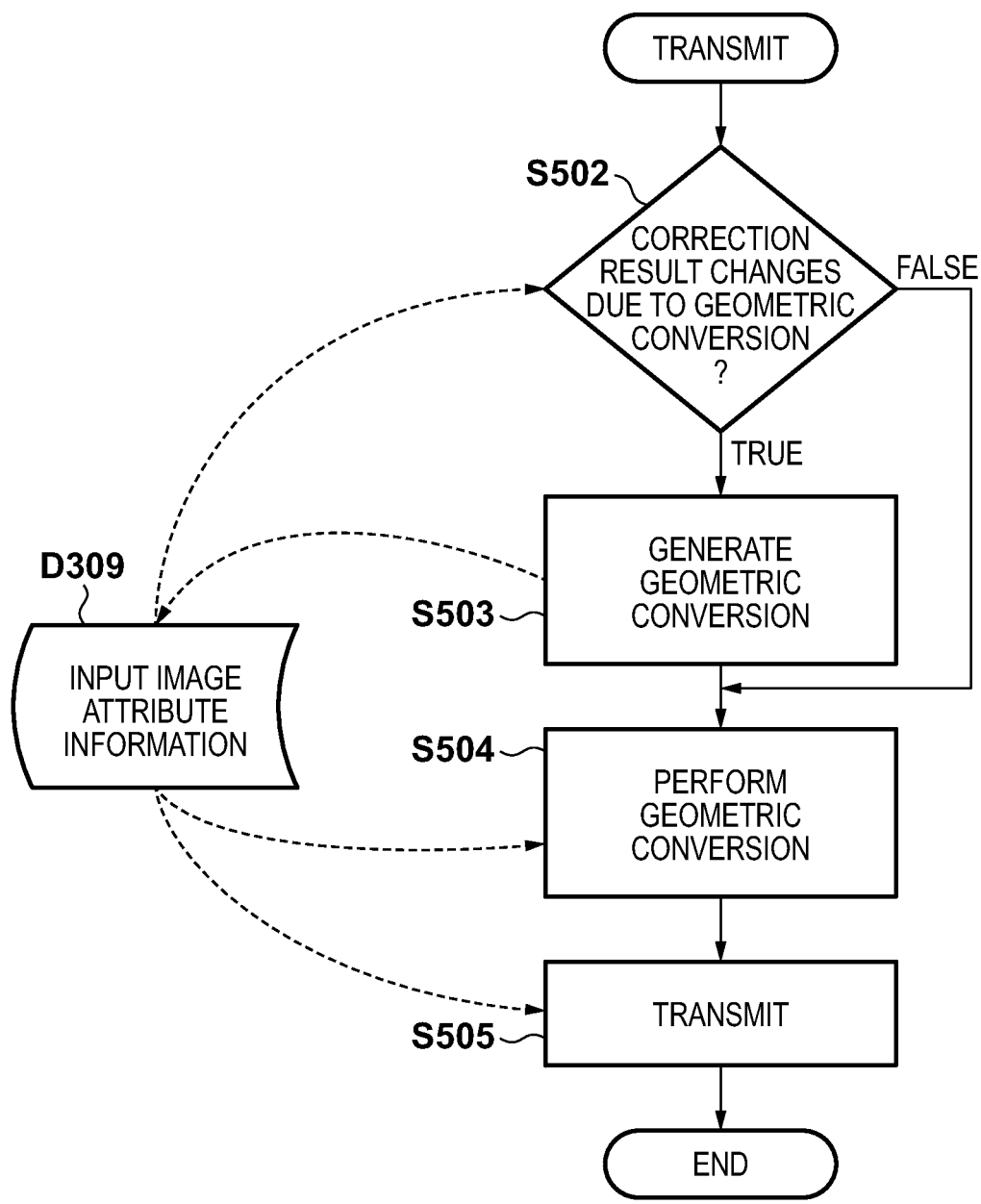
FIG. 5 is a flowchart of transmission processing according to the first embodiment.

Next is a detailed description of transmission step S307 of the processing flow in FIG. 3, with reference to FIG. 5. First, it is determined in S502 if other correction processing has been instructed, whether the correction result of that correction processing changes due to geometric conversion indicated by the user instruction stored in the storage unit D309. If the correction result changes due to the geometric conversion indicated by the user instruction, geometric conversion is newly generated automatically in geometric conversion generation S503, and the generated conversion is stored in D309 as automatically generated geometric conversion. The automatically generated geometric conversion is performed in geometric conversion S504, and data in D309 is transmitted as transmission data in S505. If the correction result does not change due to geometric conversion, geometric conversion indicated by the user instruction is performed in geometric conversion S504, and data in D309 is transmitted as transmission data in transmission S505.

In geometric conversion S504, geometric conversion is performed only in a case in which the amount of data of the geometrically converted image is smaller than that of the original image. Examples of such a case include when geometric conversion is reduction processing, when trimming processing is performed so as to obtain an area smaller than the original image, and the like. If geometrically converted image data is stored in D309 and transmitted to downstream processing, the instructions and parameters for the geometric conversion are deleted from the storage unit D309 so as to be excluded from transmission targets.

As a method of determining in S502 whether the correction result changes due to geometric conversion, for example, correction processing may be performed on both image data on which geometric conversion has not been performed and geometrically converted image data, and the results may be compared. Note that the former may be referred to as second image data, and the latter may be referred to as first image data. Alternatively, estimation may be performed based on the type of correction processing, the content of a correction instruction (correction parameter, for instance), the result of detection of a specific object (for example, face detection), or the like. For example, the type of correction or detection processing and the type of geometric conversion are associated, and a table, for instance, that specifies combinations that may cause a change in the result is created in advance, and then estimation can be performed based on that table. Specifically, the results of correction using information on the entire image, namely, for example, correction using a luminance histogram, and correction using the region of part of an image, namely, for example, correction using face detection or the result thereof, for instance, may change depending on whether or not trimming is performed. In view of this, the combinations of these corrections and trimming are registered in advance as those having a possibility of causing a change in the correction result, and if an instructed correction is such correction, and trimming is instructed at the same time, it is determined that the correction result will change. Of course, this is an example, and there may also be other combinations. Further, even if the table for estimation is not provided as a table, it is sufficient that it can be determined whether the correction result will change.

Further, in the determination here as to whether an image is changed depending on whether or not geometric conversion is performed, if image data resulting from correction processing exhibits a binary match, it may be determined that there is no change. Alternatively, the PSNR (Peak Signal-to-Noise Ratio) between an image obtained by performing correction processing after performing geometric conversion and an image obtained by performing correction processing without performing geometric conversion may be evaluated, and it may be determined that there is no change if the value thereof is in a satisfactory range for actual use exceeding a predetermined value (for example, 50 db) or the like. Note that in a case in which a correction result obtained by performing correction processing on geometrically converted image data and the correction result obtained by performing correction processing on an original image are compared, it is difficult to simply compare the results since geometric conversion is performed on one of the pieces of data. In view of this, for example, geometric conversion performed on the other piece of image data to be compared is performed on correction image data obtained by performing correction processing on the original image. This establishes pixel-to-pixel correspondence between the image data pieces to be compared, and the pixels are compared. Of course, this is an example, and other methods can also be adopted.

Note that it may be determined, preceding the comparison determination in step S502, whether or not instructed geometric transformation processing is processing for reducing the size of the target image data, and processing in S502 and steps thereafter may be performed only if the processing is size reduction processing. If the processing is not size reduction processing, original image data and attribute information are transmitted as-is.

Geometric Conversion Generation Processing

Next is a detailed description of a generation method for geometric conversion generation processing S503 in FIG. 5. Correction processing includes (1) correction using information on the entire image, (2) correction using the region of part of an image, and (3) correction not using information on an image. Examples of (1) include automatic photograph correction utilizing an image histogram, brightness correction utilizing the brightness of the entire image, and the like. Examples of (2) include automatic beautiful skin correction using a face detection result, mole removal using a region designated by the user, and the like. Examples of (3) include RGB adjustment, contrast adjustment, and the like. Geometric conversion that is automatically generated also changes according to the type of such correction processing.

Now, an example will be described with reference to FIG. 6. It is assumed that automatic brightness correction is executed on an original image 601 containing a face region 602, and thereafter a reduction instruction is given from the user. Automatic brightness correction is assumed to be performed using information on the brightness of the entire image. If reduction processing is performed on the original image in accordance with the reduction instruction from the user, the result will be an image such as a reduced image 603. It is assumed that the brightness of the entire image has changed at this time by the reduction according to the instruction. For example, if reduction is realized by thinning out pixels, and the average luminance of the pixels thinned out differs from the average luminance of the entire image before reduction, a change in the luminance may be generated. In this case, if correction processing performed in downstream processing is processing that causes a change in the result according to the luminance of the entire image, a reduction processing parameter that does not cause a change in the brightness of the entire image is generated as a geometric conversion instruction, in geometric conversion generation step S503. In this way, the result of downstream correction processing can be prevented from differing from the result of correction processing on an original image due to reduction processing. For example, an acceptable value for a change in the average luminance due to reduction is determined in advance, and stored. Then, the average luminance of the original image and the average luminance of the reduced image are compared, and if the difference therebetween is equal to or less than a predetermined value, the reduced image serves as a transmission image assuming that there is no change. However, if the difference in the luminance exceeds the predetermined value, the reduction ratio is decreased (specifically, the reduction ratio is changed so as to enlarge the reduced image), reduction processing is performed again, and it is determined whether or not the difference from the luminance of the original image is equal to or less than a predetermined value. If it is not, the same operation is repeated, the reduction ratio at which the difference from the luminance of the original image will be equal to or less than a predetermined value and that is closest to the designated reduction ratio is determined. Then, image data reduced at the determined reduction ratio serves as transmission image data 604. The transmission image data 604 is generated in this way. In this case, in downstream processing, since it is necessary to further reduce the image so as to be the image reduced at the designated reduction ratio, the reduction ratio for further reduction processing is calculated, and is transmitted together with information that indicates designation of reduction conversion and the image data 604 to the image processing apparatus for downstream processing. Of course, this is an example, and a parameter is changed in the same manner with regard to other combinations of correction processing and geometric conversion.

Note that in the above example, correction processing is not attempted, and by performing geometric conversion such that information referred to in correction processing may not change, the result of correction processing is prevented from changing depending on whether geometric conversion is performed. In contrast, image processing is performed on original image data and geometrically converted image data, and the difference therebetween is quantitatively evaluated using PSNR or the like, a parameter of geometric conversion that does not influence the result of downstream correction processing may be searched for as in the above case.

However, for example, since the amount of data increases due to enlargement in the case of enlargement processing, original image data, an instruction for enlargement processing, and an enlargement ratio are transmitted to the image processing apparatus for downstream processing, and geometric conversion is performed in downstream processing. In this way, geometric conversion transformation that increases the data amount is executed in downstream processing.

Assume that face detection is performed on an original image 605 in upstream processing, which generates a face detection result 608, and automatic beautiful skin correction is executed on a correction area 607 in downstream processing according to the result. Automatic beautiful skin correction is a function for, for example, removing freckles, blemishes, and the like and causing the skin to look smooth by smoothing a color change and the texture in the detected face region. Specifically, beautiful skin correction is correction performed on a partial region, namely, a face region. It is assumed that the trimming of a region 606 is instructed from the user together with the designation of beautiful skin correction. At this time, if trimming is performed in accordance with the instruction from the user, the transmission image will be an image in which a part of the face region is lost as an image 609. If this image data is transmitted to downstream processing, and beautiful skin correction is performed thereon, correction is executed in the state in which the region originally serving as a target is missing, and consequently, a result different from that in the case in which beautiful skin correction is performed on an original image on which trimming is not performed may be generated. In view of this, in geometric conversion generation S503, a trimming parameter (specifically, the area) is generated as a geometric conversion instruction so as to avoid cutting away the correction area 607 for automatic beautiful skin correction, and trimming is performed in accordance with that parameter. Then, image data obtained as a result of the conversion is stored in the storage unit D309. A transmission image 610 is generated in this way. With the image, the parameter that indicates the region 606, which is the trimming area originally designated by the user, is also stored in the storage unit D309 together with the trimming instruction. This parameter is also transmitted together with the transmission image data 610 for downstream processing.

This is an example, and the important point is that geometric conversion is generated so as to avoid a change in information necessary for correction processing before and after geometric conversion.

Here, the criterion as to whether an image changes depending on whether or not geometric conversion is performed may be a binary match of image data or a satisfactory range for actual use in which the PSNR is 50 db or more as described above.

As described above, in the present embodiment, by changing a geometric conversion instruction designated by the user according to the type of correction processing, the correction result is prevented from changing due to geometric conversion, and the amount of image data to be transferred is suppressed.

Figure 10:
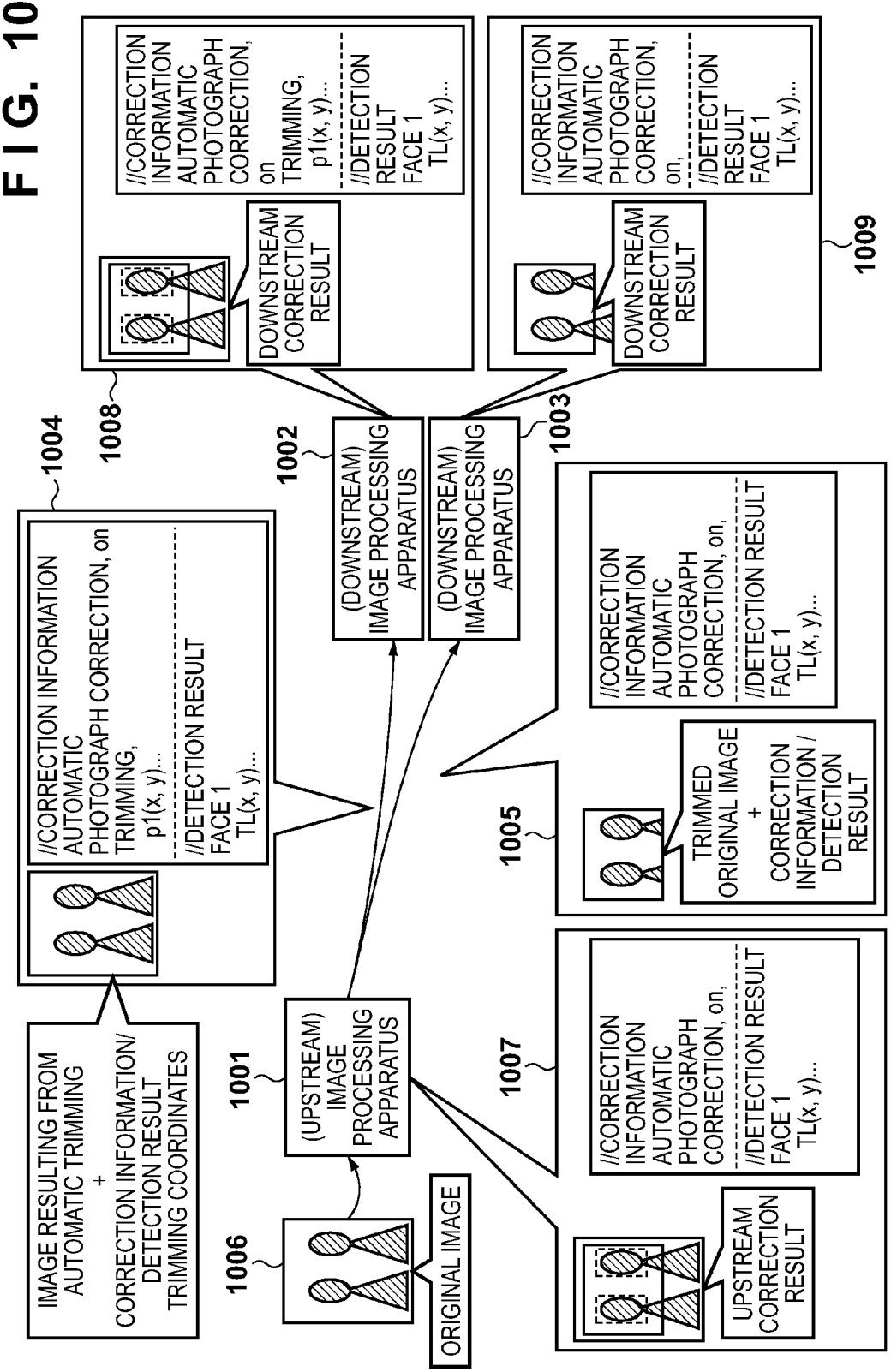
FIG. 10 is a diagram illustrating an effect of the first embodiment.

FIG. 10 shows an example of the workflow in which such processing is performed. First, original image data 1006 is input to an image processing apparatus for upstream processing (simply referred to as upstream processing) 1001. An operator designates trimming and automatic photograph correction with respect to the original image data 1006. Here, automatic photograph correction includes face detection and beautiful skin correction. Then, in upstream processing, it is determined whether the result of beautiful skin correction will change depending on whether or not designated trimming is performed in accordance with the correction instruction (face detection and beautiful skin correction) and the geometric conversion instruction (trimming) 1007 that have been input in the procedure in FIG. 3 and processing parameters therefor.

If it is determined that the result will change, a parameter of geometric conversion, in other words, the area for trimming is changed in S503 in FIG. 5 such that it is determined that the result will not change. In the present embodiment, if the target area for beautiful skin correction is the detected face region, face detection is performed first so as to specify the target face region, and it is determined whether the specified face region is included in the trimming area. If there is a face region in which a portion will be lost by trimming, the trimming area is re-generated. Even if there is a face region to be lost by trimming, if a whole face region is lost as a unit, the correction target itself will be lost, and thus the trimming area may be designated as-is. Accordingly, if there is a face region in which a portion will be lost by trimming, the trimming area is set again (i.e., re-set or reconfigured) such that the entire face region in which a portion will be lost is included in the transmission image. Then, transmission data 1004 in which the result of face detection (in other words, face region), an instruction for automatic photograph correction (on), an instruction for trimming and the re-set area, and image data obtained by performing trimming based on the re-generated trimming instruction are grouped together is transmitted to an image processing apparatus 1002 for downstream processing.

In downstream processing, processing is executed in the order determined in advance in accordance with image data and processing parameters that have been received (here, a correction instruction and a geometric conversion instruction, and parameters therefor are included), and a result 1008 thereof is obtained. Note that the order determined in advance is that, for example, if there is automatically generated geometric transformation processing, correction processing whose result will be influenced if that geometric conversion is performed is performed first, thereafter geometric conversion is performed, and other correction processing is performed after that. If the processing parameters received in downstream processing include a geometric conversion instruction, it is sufficient to determine in advance correction processing performed before the geometric conversion and correction processing performed thereafter for each type of geometric conversion.

On the other hand, if it is determined that the result of beautiful skin correction will not change depending on whether or not designated trimming is performed, trimming is performed in upstream processing, image data resulting from trimming processing instructed by the user and other instructed correction processing, specifically, for example, an instruction for automatic correction processing are transmitted to downstream processing 1003 as a processing parameter 1005. In the downstream processing, designated correction processing is performed on image data that has already been geometrically converted, thereby obtaining an image 1009 thereof.

Note that in the description of FIG. 10, assuming that a printing apparatus performs downstream processing, designation of correction processing performed by a terminal of a person who receives an order is omitted.

As described above, if there is a change in a correction result 1007 in the upstream processing and the correction result 1009 in the downstream processing when geometric conversion designated by the user is performed, the result of correction designated by the user is stored in the transmission data 1004, and geometric conversion that does not cause a change in the correction result is generated automatically. Automatically generated geometric conversion is performed on a transmission image, and the resultant image is transmitted.

Workflow when Creating Album

Figure 11:
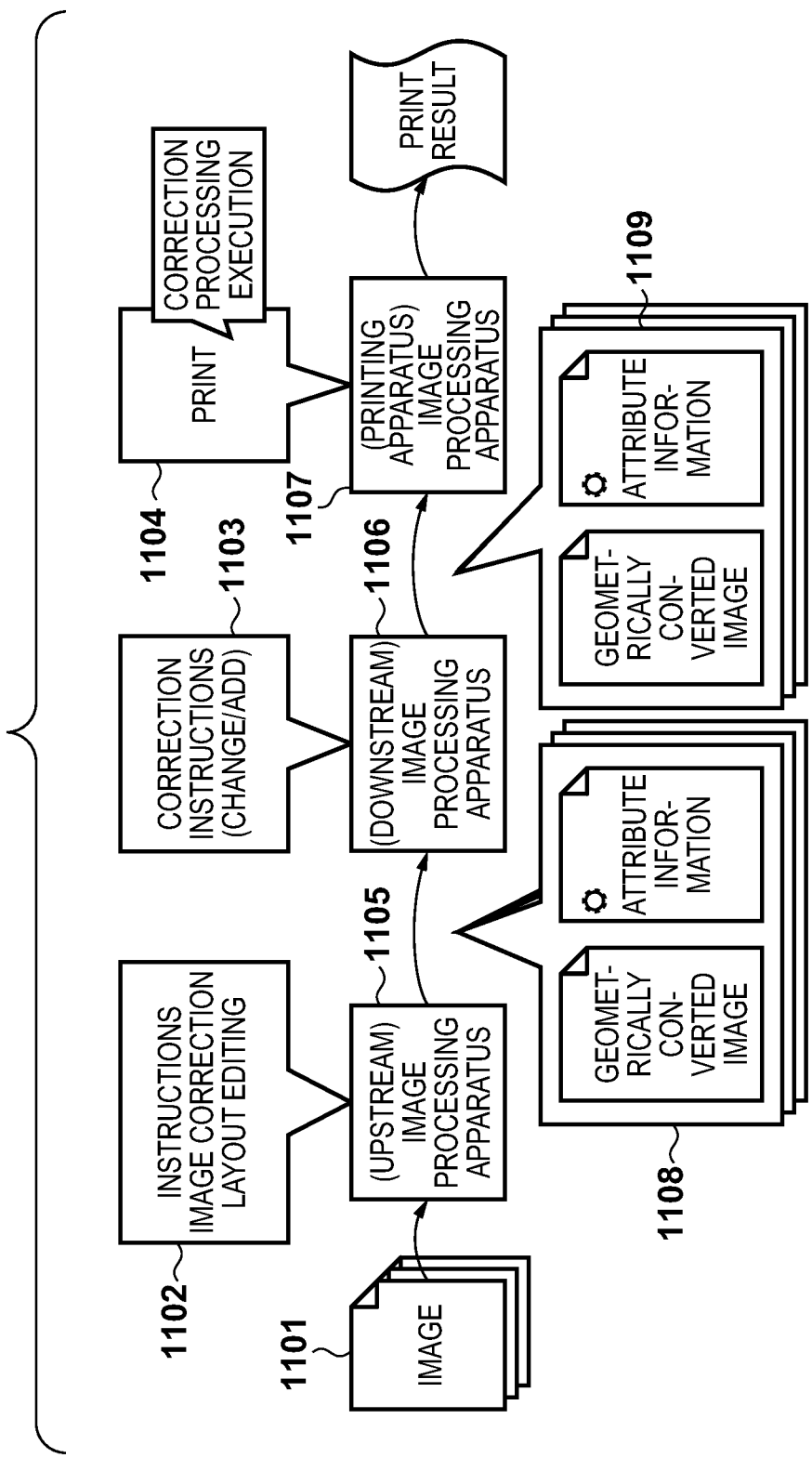
FIG. 11 is a workflow diagram of album creation according to the first embodiment.
Figure 12:
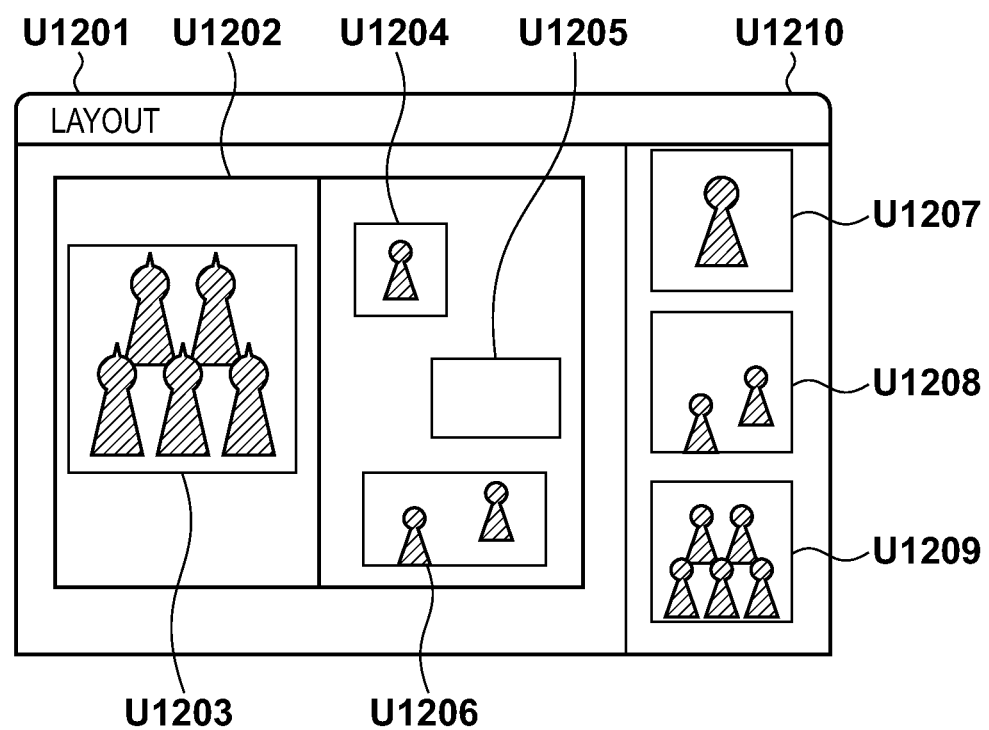
FIG. 12 is a diagram illustrating an album creation UI according to the first embodiment.

Now, the workflow when creating an album will be described with reference to FIG. 11. In album creation, a plurality of images are input and laid out. FIG. 12 shows an example of a UI U1201 for layout. A U1202 will be one page of an album. A U1203, a U1204, a U1205, and a U1206 are provided as regions for inserting photographs on that page. These insertion regions may be arbitrarily determined by the user, or may be prepared on the application side as a template. A preview of the images input by the user is displayed on a U1210. The user lays out a desired image at a desired place while looking at this preview. In this way, if album printing is instructed, the user specifies image data to be laid out, and also specifies layout parameters (attribute information) including trimming and layout thereof, correction processing, and the like at the same time.

In the example in FIG. 12, an image U1209 undergoes enlargement processing and is arranged in the layout U1203, an image U1207 undergoes reduction processing and is arranged in the layout U1204, and an image U1208 undergoes trimming processing and is arranged in the layout U1206. Cases in which automatic photograph correction beautiful skin correction, and monochrome correction are instructed to be performed on the images at this time will be separately described.

First is a description of the case in which automatic photograph correction is instructed. For the layout U1203 for which enlargement processing is instructed, if enlargement is performed in upstream processing, the amount of data to be transferred will be larger than that of the input image. In view of this, the geometric conversion instruction designated by the user is stored in attribute information, and the image data is transmitted as-is without performing geometric conversion thereon. The correction instruction for automatic photograph correction and the enlargement instruction of the user instruction are stored in the attribute information at this time.

For the layout U1204 for which reduction processing is instructed, if the result of automatic photograph correction processing in downstream processing changes depending on whether or not reduction processing designated by the user is performed, the reduction ratio designated by the user is changed so as to be a reduction ratio at which the correction result of automatic photograph correction after reduction matches the processing result obtained by performing correction without reduction. This reduction ratio is the closest to the reduction ratio designated by the user and is a value that does not exceed the reduction ratio designated by the user, among reduction ratios at which the results of correction processing will not change due to reduction processing. Reduction processing is performed on original image data at this reduction ratio. Reduction processing may not be performed at this time. If the changed reduction ratio is below the reduction ratio designated by the user, a reduction ratio that is the difference therebetween is stored in attribute information as a parameter of a reduction instruction, and the resultant information is transmitted to downstream processing. Thus, the geometric conversion instruction designated by the user is stored in the attribute information, automatically generated geometric conversion is performed on an input image, and the resultant data is transmitted to downstream processing. In this example, the correction instruction for automatic photograph correction, the reduction instruction designated by the user, and parameters therefor are stored in attribute information. In a case in which the correction result in downstream processing matches the result of correction on an original image even if an image resulting from reduction processing designated by the user is transmitted, reduction processing designated by the user is performed on the input image, and the resultant image is transmitted. The correction instruction for automatic photograph correction is stored in the attribute information at this time.

For the layout U1206 for which trimming processing is instructed, if an image obtained by performing trimming designated by the user in upstream processing is transmitted to downstream processing, the correction result in downstream processing will not match the result in the case in which trimming is not performed. Accordingly, a trimming area larger than the trimming area designated by the user is automatically generated, such that the correction result of automatic photograph correction on the image resulting from trimming matches the result of correction on the original image. At this time, trimming may not be performed. The geometric conversion instruction designated by the user is stored in attribute information, automatically generated geometric conversion is performed on the input image, and the resultant data is transmitted. The correction instruction for automatic photograph correction and the trimming instruction of the user instruction are stored in the attribute information at this time.

Next is a description of a case in which beautiful skin correction has been performed. For the layout U1203 for which enlargement processing is instructed, the amount of data to be transferred will be larger than that of an input image due to enlargement processing, and thus the geometric conversion instruction designated by the user is stored in attribute information, and the resultant data is transmitted without performing geometric conversion in upstream processing. The correction instruction for beautiful skin correction and the enlargement instruction of the user instruction are stored in the attribute information at this time.

For the layout U1204 for which reduction processing is instructed, the correction result in downstream processing matches that in the case in which reduction is not performed even if an image obtained by performing reduction processing designated by the user in upstream processing is transmitted, and thus the reduction processing designated by the user is performed on an input image, and the resultant image is transmitted. The correction instruction for beautiful skin correction is stored in the attribute information at this time.

For the layout U1206 for which trimming processing is instructed, in a case in which the correction result does not match the result of correction on an original image in downstream processing if an image resulting from trimming designated by the user is transmitted, a trimming area larger than the trimming area designated by the user is automatically generated, such that the result matches the correction result of beautiful skin correction on the original image. In this automatic generation, as in the above example, for example, a face region is detected, and the trimming area is set again such that the face region will not be divided by trimming for the area designated by the user. This re-setting is performed so as to expand the trimming area. Specifically, if a face region is divided, the area is set again such that the entire face region will be included in the trimming area. The geometric conversion instruction designated by the user is stored in attribute information, automatically generated geometric conversion is performed on an input image, and the resultant data is transmitted. The correction instruction for beautiful skin correction and the trimming instruction of the user instruction are stored in the attribute information at this time. In a case in which the correction result matches in downstream processing even if an image resulting from trimming instructed by the user is transmitted, the trimming designated by the user is performed on an input image, and the resultant image is transmitted. The correction instruction for beautiful skin correction is stored in the attribute information at this time.

Next is a description of the case in which monochrome correction is instructed. Monochrome correction is correction for converting a color image to a monochrome image, and will not be influenced by geometric conversion. In FIG. 12, for the layout U1203 for which enlargement processing is instructed, since the amount of data to be transferred will be larger than that of the input image due to upstream enlargement processing, the geometric conversion instruction designated by the user is stored in attribute information, and the resultant data is transmitted without performing geometric conversion. The correction instruction for monochrome correction and the enlargement instruction of the user instruction are stored in the attribute information at this time.

For the layout U1204 for which reduction processing is instructed, even if an image obtained by performing reduction processing designated by the user in upstream processing is transmitted, the correction result in downstream processing matches the result in the case in which the image is not reduced, and thus reduction processing designated by the user is performed on the input image, and the resultant data is transmitted. The correction instruction for monochrome correction is stored in the attribute information at this time.

For the layout U1206 for which trimming processing is instructed, even if an image resulting from trimming instructed by the user is transmitted, the correction result in downstream processing matches the result of correction on the original image. Accordingly, the trimming designated by the user is performed on the input image, and the resultant data is transmitted. The correction instruction for monochrome correction is stored in the attribute information at this time. As described, correction processing that is known not to be influenced by geometric conversion, specifically, correction processing that is known to be independent of geometric conversion is registered in advance in the image processing apparatus for upstream processing. Then, if instructed corrections are only those independent of geometric conversion, with regard to that processing, it is not necessary to compare the results, and geometric conversion is performed in upstream processing.

As described above, with regard to individual image data, parameters for geometric transformation processing and correction processing are transmitted from upstream processing to downstream processing together with image data. Together therewith, album data also including information for designating the layout for constituting an album is transmitted from upstream processing to downstream processing.

In this way, with original image data 1101 serving as a target, an album is created in upstream processing 1105 based on instructions 1102. If this album data 1108 is received in downstream processing 1106, the processing result in upstream processing is displayed as a preview. The display flow at this time will be described. First, processing in accordance with the correction instructions stored in attribute information of received data is performed on the received image. After that, if there is a geometric conversion instruction designated by the user, geometric conversion is performed on the corrected image, and the resultant image is displayed as a preview. Here, an operator adjusts the tone of the image, and performs adjustment of the entire album, for instance. The result thereof is stored in the attribute information. If geometric conversion is also performed in the downstream processing 1106, processing similar to that performed in the upstream processing 1105 is performed.

Album data 1109 on which adjustment processing according to adjustment instructions 1103 has ended in the downstream processing 1106 is transmitted to a printing apparatus 1107. The printing apparatus 1107 performs the correction processing 1104 in accordance with the correction instruction stored in the attribute information of the received image. After that, if there is a geometric conversion instruction designated by the user, geometric transformation processing is performed on the corrected image, and the result is laid out on the album and printed.

Effect of Embodiment

In this way, the amount of data to be transferred from upstream processing to downstream processing can be suppressed while securing image quality on a comparable level to that in a case in which correction processing has been performed on an original image.

Figure 9A:
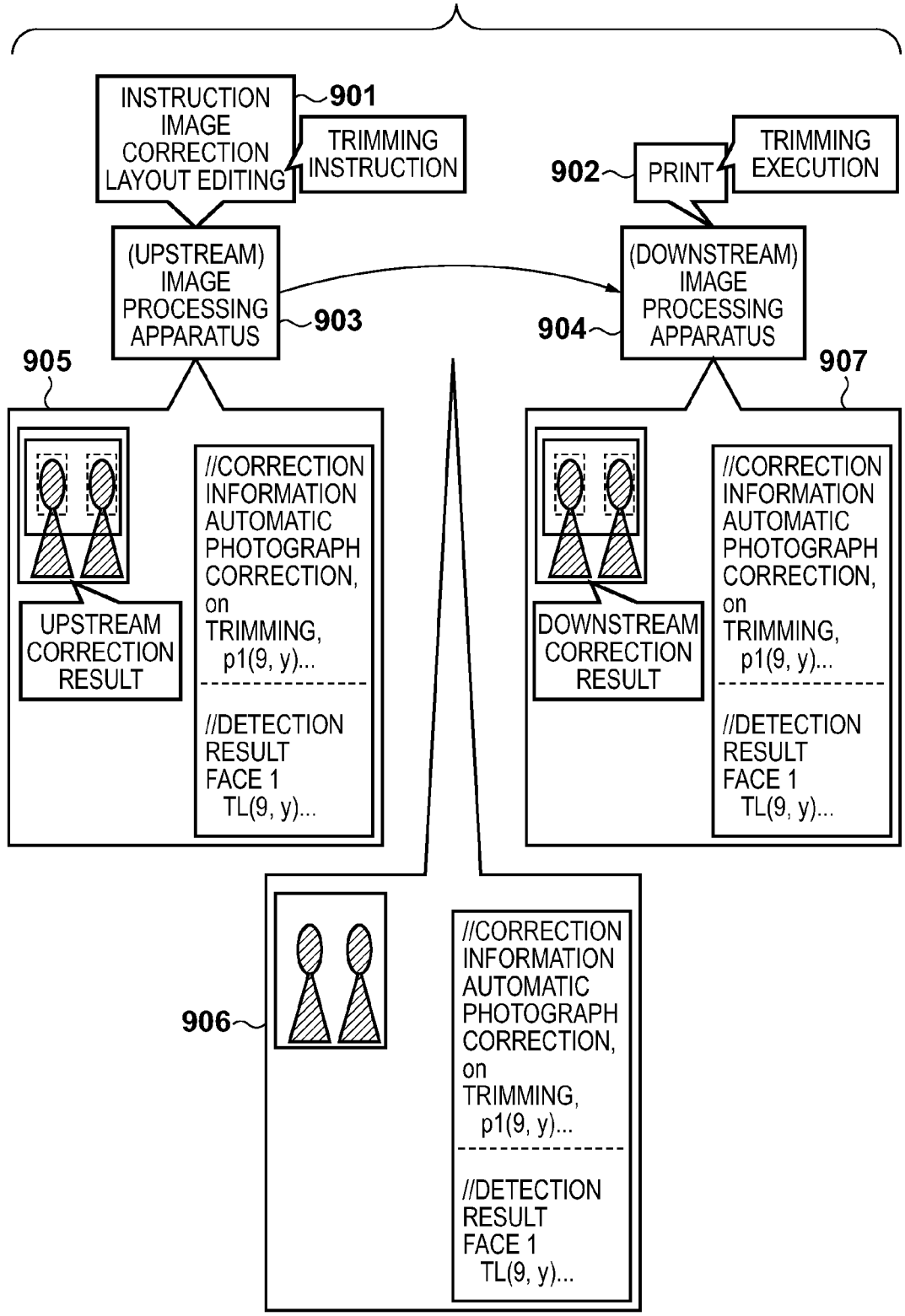
FIG. 9A is a diagram illustrating an effect.

Consider situations such as shown in FIGS. 9A and 9B, for example. Conventionally, even if geometric conversion is performed as shown in FIG. 8, an original image is transmitted from upstream processing to downstream processing in both cases of automatic photograph correction and brightness adjustment correction. In the present embodiment, as in FIG. 9B, with regard to brightness adjustment, even if geometric conversion is performed, there is no change in a correction result 912 in an upstream processing apparatus 910 and a correction result 914 in downstream processing 911 that performs print processing 909. In view of this, trimming in accordance with the user instruction 908 is executed in the upstream processing apparatus 910, and the geometrically converted image is transmitted to the downstream processing 911 as transmission data 913.

On the other hand, as in FIG. 9A, in the present embodiment, if a correction result 905 of the correction implemented in upstream processing 903 changes due to the user instruction trimming in accordance with an instruction 901, trimming that does not cause a change in the correction result is automatically generated, and the automatically generated trimming is performed on a transmission image 906. The trimming in accordance with the user instruction is stored in the transmission data 906 that is transmitted to a downstream image processing apparatus 904. The downstream image processing apparatus 904 performs print processing 902 based on the correction result 907 in the downstream image processing apparatus 904.

Thus, in the present invention, only an image necessary for correction processing can be transmitted, and the amount of data to be transferred can be suppressed compared with the conventional technique, while securing image quality.

Embodiment 2

In Embodiment 1, a geometrically converted image is transmitted as transmission data from the image processing apparatus for upstream processing. Accordingly, in the image processing apparatus for downstream processing that has received that transmission data, the geometrically converted image will serve as a target for correction processing. Accordingly, the detection result and a correction instruction depending on the coordinate system in the attribute information will not match the coordinate system of the image as they are.

In the present embodiment, in order to solve the above problem, a means for changing attribute information according to geometric conversion implemented on a transmission image is added to the first embodiment. Detection results and correction instructions depending on the coordinate system here refer to face detection coordinates, a correction area designated for mole removal, and the like.

An example will be described with reference to FIGS. 7A and 7B. Assume that there are face detection coordinates 703 and face detection coordinates 705 in an original image 702 in FIG. 7A. The original image 702 is trimmed so as to be a trimming area 704. The face detection coordinates 703 and 705 are initially represented by an original-image coordinate system 701. However, in the trimmed image, the accurate positions of the face detection coordinates 703 and 705 cannot be represented unless they are represented using a trimmed-image coordinate system 706 in FIG. 7B. Accordingly, it is necessary to convert the face detection coordinates 703 and 705 from the original-image coordinate system 701 to the trimmed image coordinate system 706.

The conversion method here can be performed by calculation processing for coordinate system conversion. Examples will be described with reference to FIGS. 7A to 7F.

In the case of trimming, coordinate conversion for parallel movement of the face detection coordinates 703 and 705 is performed with the point at the upper left of the trimming area serving as the origin. It is assumed that the point at the upper left of the trimming area is $(x_{LT}, y_{LT})$, and the face detection coordinates 703 are represented by a rectangular region having two points, namely, $(faceX_{LT}, faceY_{LT})$ and $(faceX_{RB}, faceY_{RB})$ at diagonal positions and sides parallel to the coordinate axis. The converted face detection coordinates will be $(faceX_{LT}-x_{LT}, faceY_{LT}-y_{LT})$ and $(faceX_{RB}-x_{LT}, faceY_{RB}-y_{LT})$.

In the case of the enlargement/reduction conversion shown in FIGS. 7C and 7D, the distance from the point at the upper left of the converted image is extended/shortened. It is assumed that the scaling factor of the enlargement/reduction processing is N, and the face detection coordinates 703 are expressed by two points, namely, $(faceX_{LT}, faceY_{LT})$ and $(faceX_{RB}, faceY_{RB})$. The face detection coordinates in a converted coordinate system 707 will be $(faceX_{LT}\times N, faceY_{LT}\times N)$ and $(faceX_{RB}\times N, faceY_{RB}\times N)$. Here, although calculation is performed using the same scaling factor for both the vertical and horizontal directions, different scaling factors may be used, and in that case, the scaling factor by which the x coordinate is multiplied and the scaling factor by which the y coordinate is multiplied will be different.

In the case of rotation conversion shown in FIGS. 7E and 7F, first, parallel movement is performed with the origin, specifically, the point at the upper left of the image serving as the center of the rotation, and after that, rotation conversion is performed using the new origin obtained by the parallel movement as the rotation center. It is assumed that the rotation angle is (deg), the rotation center is $(x_{LT}, y_{LT})$, and the face detection coordinates 703 are represented by a rectangular region having two points, namely, $(faceX_{LT}, faceY_{LT})$ and $(faceX_{RB}, faceY_{RB})$ at diagonal positions. The face detection coordinates in a converted coordinate system 709 will be represented by a region 708 having the following four points as vertices: $((faceX_{LT}-x_{LT})\times\cos(deg)+(faceY_{LT}-y_{LT})\times\sin(deg), -(faceX_{LT}-x_{LT})\times\sin(deg)+(faceY_{LT}-y_{LT})\times\cos(deg))$; $((faceX_{LT}-x_{LT})\times\cos(deg)+(faceY_{RB}-y_{LT})\times\sin(deg), -(faceX_{LT}-x_{LT})\times\sin(deg)+(faceY_{RB}-y_{LT})\times\cos(deg))$; $((faceX_{RB}-x_{LT})\times\cos(deg)+(faceY_{LT}-y_{LT})\times\sin(deg), -(faceX_{RB}-x_{LT})\times\sin(deg)+(faceY_{LT}-y_{LT})\times\cos(deg))$; $((faceX_{RB}-x_{LT})\times\cos(deg)+(faceY_{RB}-y_{LT})\times\sin(deg), -(faceX_{RB}-x_{LT})\times\sin(deg)+(faceY_{RB}-y_{LT})\times\cos(deg))$ Since this is an example, other calculation methods may be used, and the important point is that the detection coordinates are correctly represented even after geometric conversion.

As described above, in the present embodiment, correct face detection coordinates can be represented with respect to an image by performing coordinate conversion, the detection result can be utilized even after geometric conversion, and a match of correction results can be achieved.

For example, in FIG. 2, face detection processing is performed in the upstream processing 205, and face detection coordinates are acquired. The face detection coordinates are stored in attribute information. If geometric conversion is instructed by the user instruction 202, the image of the transmission data 208 is a geometrically converted image. At this time, if the face detection coordinates are transmitted as they are, the coordinates will not match those in the image, and thus the correction results will not match or it will be necessary to execute face detection again. However, by converting the face detection coordinates in accordance with the geometrically converted image, the correction results match even in the downstream processing 206, and thus it is not necessary to execute face detection again either.

Conversion of a coordinate system may be performed before transmission, or may be performed after reception or before correction processing. In the case of performing conversion after reception or before correction processing, an instruction for geometric conversion performed on a transmission image is also stored in attribute information, and the resultant data is transmitted.

As described above, in the present embodiment, even if geometric conversion is performed on a transmission image, by performing coordinate conversion to a coordinate system of a geometrically converted image with regard to the detection result and a correction instruction depending on a coordinate system, the detection result can be reused and the correction image quality can be secured.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-207156, filed Sep. 15, 2010, which is hereby incorporated by reference herein in its entirety.

What is claimed is:

1. An image processing apparatus that accepts an instruction for processing with respect to target image data, the image processing apparatus comprising at least one processor which functions as:
a determination unit, configured to calculate a difference between first image data obtained by performing instructed geometric transformation processing using a set first parameter and instructed correction processing on the target image data and second image data obtained by performing the instructed correction processing on the target image data, and determine whether the difference exceeds a predetermined value;
a performing unit, configured to perform, in a case where the determination unit determines that the difference exceeds the predetermined value, the geometric transformation processing for the target image using a second parameter that is different from the first parameter such that the difference between the first image data and the second image data is equal to or less than the predetermined value; and
a transmission unit, configured to transmit, to an apparatus connected with the image processing apparatus via a communication network, image data that the performing unit has performed geometric transformation processing on together with information indicating the instructed correction processing and information indicating the instructed geometric transformation processing,
wherein if the instructed correction processing is correction processing that uses a portion of the target image data, the second parameter used by the performing unit is set such that the portion is included in the geometrically converted image data.

2. The image processing apparatus according to claim 1, wherein the geometric transformation processing includes at least one of scaling, trimming, and rotation.

3. The image processing apparatus according to claim 1, wherein the instruction information further includes a detection result obtained by performing processing for detecting a specific object.

4. The image processing apparatus according to claim 1, wherein the portion includes at least coordinates of the specific object detected by the detection processing or an area serving as a target for the instructed correction processing.

5. The image processing apparatus according to claim 1, further comprising:
a unit that determines, prior to the determination by the determination unit, whether or not the instructed geometric transformation processing reduces a size of the target image data,
wherein if the instructed geometric transformation processing does not reduces the size, the transmission unit transmits, to the image processing apparatus in the next stage, the target image data together with instruction information including the instruction information indicating the instructed correction processing and the instruction information indicating the instructed geometric transformation processing.

6. The image processing apparatus according to claim 1, wherein the transmission unit converts the parameter of the geometric transformation processing included in the instruction information according to the geometric transformation processing performed on the target image data.

7. The image processing apparatus according to claim 1, wherein in a case in which the instructed correction processing includes correction processing to be performed on a face region, the determination unit determines that there is a difference between the first image data and the second image data if a correction result obtained by detecting the face region and performing correction on the face region changes depending on whether or not the instructed geometric transformation processing has been performed.

8. The image processing apparatus according to claim 1, wherein the determination unit compares image data obtained by performing the geometric transformation processing that has been performed on the first image data on the second image data with the first image data.

9. A non-transitory recording medium that has recorded thereon a program for causing a computer to execute an image processing method, the image processing method executed by at least one processor of an image processing apparatus, the method comprising:
- a determination step of calculating a difference between first image data obtained by performing instructed geometric transformation processing using a set first parameter and instructed correction processing on target image data and second image data obtained by performing the instructed correction processing on the target image data, and determining whether the difference exceeds a predetermined value;
- a performing step of performing, in a case where it is determined that the difference exceeds the predetermined value in the determination step, of the geometric transformation processing for the target image using a second parameter that is different from the first parameter such that the difference between the first image data and the second image data is equal to or less than the predetermined value; and
- a transmission step of transmitting, to an apparatus connected with the image processing apparatus via a communication network, image data that the geometric transformation processing has been performed on in the performing step together with information indicating the instructed correction processing and information indicating the instructed geometric transformation processing,
- wherein if the instructed correction processing is correction processing that uses a portion of the target image data, the second parameter used by the performing unit is set such that the portion is included in the geometrically converted image data.

10. An image processing method that is executed by an image processing apparatus, which accepts an instruction for processing with respect to target image data, the method comprising:
- calculating a difference between first image data obtained by performing instructed geometric transformation processing using a set first parameter and instructed correction processing on the target image data and second image data obtained by performing the instructed correction processing on the target image data, and determine whether the difference exceeds a predetermined value;
- performing, in a case where it is determined that the difference exceeds the predetermined value, the geometric transformation processing for the target image using a second parameter that is different from the first parameter such that the difference between the first image data and the second image data is equal to or less than the predetermined value; and
- transmitting, to an apparatus connected with the image processing apparatus via a communication network, image data on which the geometric transformation processing has been performed together with information indicating the instructed correction processing and information indicating the instructed geometric transformation processing,
- wherein if the instructed correction processing is correction processing that uses a portion of the target image data, the second parameter used in the performing is set such that the portion is included in the geometrically converted image data.

* * * * *